US006681020B1

(12) United States Patent
Papopoulos et al.

(10) Patent No.: US 6,681,020 B1
(45) Date of Patent: Jan. 20, 2004

(54) MICROPHONE CIRCUIT WITH MUTE AND KEEP ALIVE FUNCTION

(75) Inventors: Costas Papopoulos, Acton, MA (US); David J. Truesdell, Acton, MA (US); Victor J. Temple, Dover, NH (US)

(73) Assignee: VXI Corporation, Rollingsworth, NH (US)

( * ) Notice: Subject to any disclaimer, the term of this patent is extended or adjusted under 35 U.S.C. 154(b) by 0 days.

(21) Appl. No.: 09/289,366

(22) Filed: Apr. 9, 1999

(51) Int. Cl.[7] .......................... H04R 3/00; H04B 15/00
(52) U.S. Cl. ...................... 381/122; 381/111; 381/94.5
(58) Field of Search ................................ 381/111, 122, 381/94.5

(56) References Cited

U.S. PATENT DOCUMENTS 4,629,910 A * 12/1986 Early et al. ................ 381/113
5,377,273 A * 12/1994 Sutton ........................ 381/122
5,459,792 A * 10/1995 Reichel et al. .............. 381/111
5,838,803 A * 11/1998 Keum et al. ............... 381/94.5
5,940,486 A * 8/1999 Schlaff ....................... 379/167
5,943,649 A * 8/1999 Fado et al. ................. 704/270
6,137,879 A * 10/2000 Papadopoulos et al. ..... 379/387
6,504,937 B1 * 1/2003 Papadopoulos et al. ..... 381/113
6,580,797 B1 * 6/2003 Papadopoulos et al. ..... 381/111

* cited by examiner

*Primary Examiner*—Minsun Oh Harvey
*Assistant Examiner*—Laura A. Grier
(74) *Attorney, Agent, or Firm*—Samuels, Gauthier & Stevens, LLP

(57) ABSTRACT

A microphone system including a microphone for inputting voice data, an output for transmitting the voice data to a device connectable thereto; and a circuit which operates to mute the voice data and provide a signal to the device in order to maintain a suspended state of operation in the device. The device may be a computer that is responsive to voice data, for example, by utilizing voice recognition software.

27 Claims, 5 Drawing Sheets

MICROPHONE CIRCUIT WITH MUTE AND KEEP ALIVE FUNCTION

BACKGROUND OF THE INVENTION

The invention relates to the field of microphones, and in particular to microphones with mute and keep alive functions.

Speech recognition software is a tool for increasing office productivity, particularly for entering text in word processing applications with personal computers. Such software performs best when the voice input is provided via a "close talking" headset microphone, that is a microphone with acoustic cancellation of background noise. Desk or monitor supported microphones may also be used successfully in quiet environments. The microphone signal is applied to the corresponding input connector of the computer sound card. It is evident that by wearing a headset, dictation becomes a hands-free operation and is therefore valuable for individuals with limited use of hands or arms. When the person dictating text into the microphone wishes instead to speak with a person in the area, an awkward situation develops in which the operator has to remember and say "go to sleep" or "stop listening" to the speech recognition software. This will prevent the computer from recording the person to person conversation, however, resumption of proper dictation will require another spoken command such as "wake up" or "listen to me."

It is therefore appropriate to interpose a mute switch between the microphone and the computer sound card. An exemplary headset product is the VXI Corporation model Parrott QD-10 with a QD 500 mute switch. Such switches are also used with telephony headsets where the mute function prevents the calling party (perhaps the customer) from hearing the called party (a service agent) while he or she asks another agent a question. An exemplary telephony headset is VXI Corporation model PB-QD-10-6, again with a QD 500 mute switch. Microphone mute switches are configured for "clickless" operation where electrical transients are suppressed and hence objectionable audible clicks are prevented. The resulting silence while muted to the computer creates an undesirable condition for the software: the speech recognition program hears nothing, attempts to increase microphone sensitivity to process inaudible information and becomes saturated (causing a significant delay of several seconds) when the mic is unmuted and voice returns to the computer.

SUMMARY OF THE INVENTION

Accordingly, the invention provides in an exemplary embodiment a microphone system including a microphone for inputting voice data, an output for transmitting the voice data to a device connectable thereto; and a circuit which operates to mute the voice data and provide a signal to the device in order to maintain a suspended state of operation in the device. In accordance with one aspect of the invention, the device is a computer that is responsive to voice data, for example, by utilizing voice recognition software.

The invention provides a microphone with mute switch and circuitry. When the microphone is muted, a "keep alive" circuit will inject a signal into the computer microphone input. This signal has characteristics unlike speech, thus preventing misinterpretation and is of sufficient amplitude to inhibit attempts by the software to increase microphone sensitivity. The circuit is powered from the current limited mic bias source provided by the sound card, thus requiring no external batteries. A mic bias current is required by the electret, which is the microphone type most frequently used in telephony and voice-enabled computer applications. However, the invention applies equally when the less common dynamic microphones are used instead. Additional circuitry is provided for optimum utilization of the limited DC power available from the sound card when either the microphone or the "keep alive" stage is energized. Personal computer "sound card" circuits are now commonly part of the system board (motherboard), but appear no different at the mic input connector.

Related techniques for "keep alive" functions are described in co-pending U.S. patent application Ser. No. 09/130,745 filed Aug. 7, 1998 and for optimum. DC power extraction in Ser. No. 09/115,980 filed Jul. 15, 1998, both of common assignee.

DETAILED DESCRIPTION OF THE INVENTION

Figure 1:
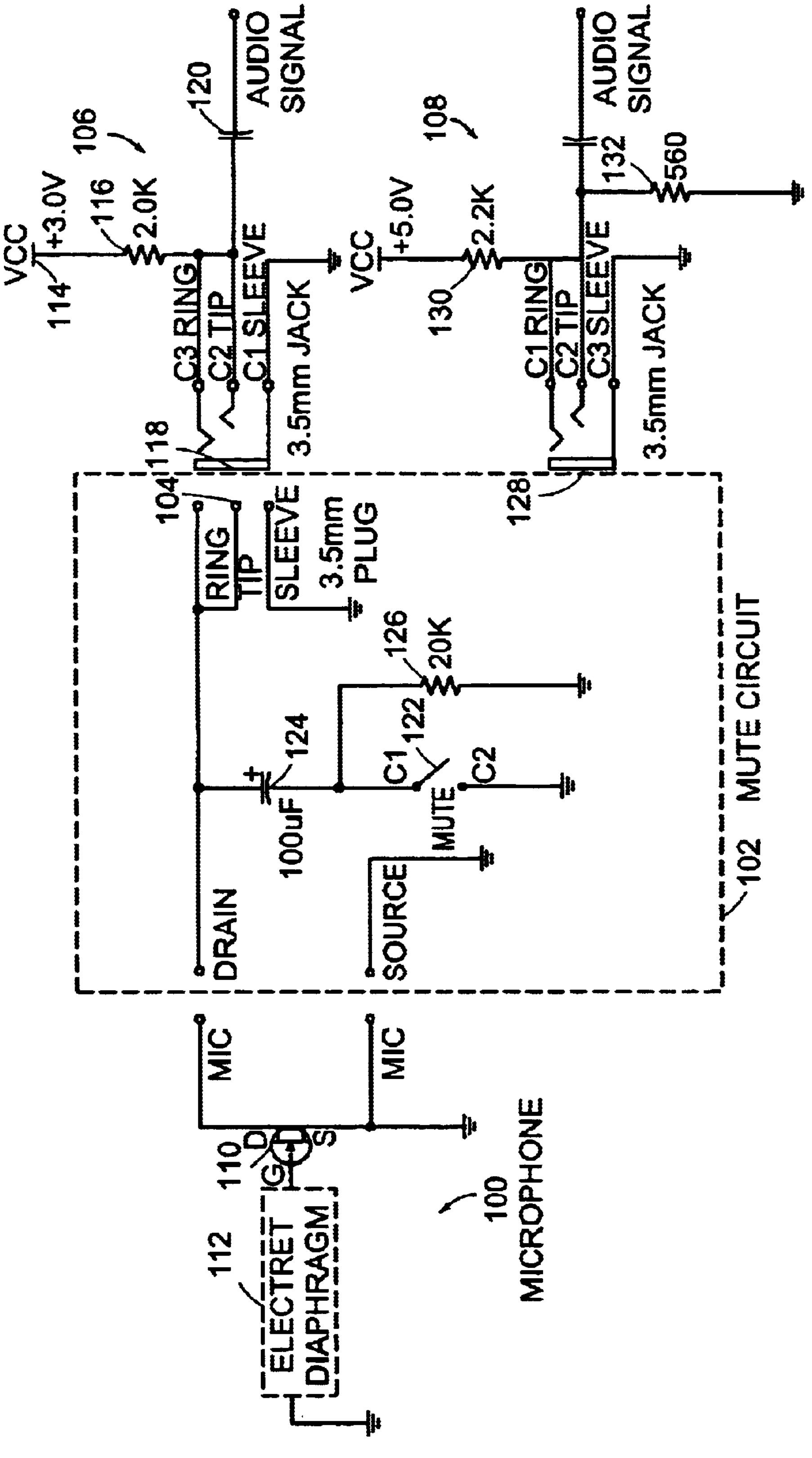
FIG. 1 is a schematic diagram of a prior art computer microphone with mute function.

FIG. 1 is a schematic circuit diagram of an exemplary prior art microphone assembly 100 with a microphone (not shown), a mute circuit 102 and associated plug connections 104 for connection to one of a variety of computer sound cards 106, 108. A JFET transistor 110 is provided inside the micro phone housing and acts as a buffer between the very high impedance level at electret diaphragm 112 and output terminals MIC DRAIN and MIC SOURCE.

The sound card 106 includes a VCC source 114 such as +3.0V and a load resistor 116 (e.g., 2.0 kΩ) to enable the JFET to operate as a class A amplifier and are shown as part of an exemplary sound card input circuit 106 at jack 118. The DC path is from VCC to the resistor 116 to transistor 110 to ground. The amplifier output impedance is approximately equal to the value of resistor 116 and the audio signal is coupled through a capacitor 120 to analog stages in the sound card and ultimately to analog-to-digital converters.

The mute circuit 102 includes a mute switch 122 that may be closed in order to suppress the mic output without introducing transients. Prior to switch actuation, a capacitor 124 (e.g., 100 μF) is fully charged through a resistor 126 (e.g., 20 kΩ) to the quiescent voltage at MIC DRAIN. When resistor 126 is shorted by switch 122, there is no DC change in the circuit, but the capacitor 124 acts a short to ground at voice frequencies. Thus, audible clicks from the switching action are avoided and subsequently no voice data are passed on to the sound card.

Connector jack 118 is typically a 3.5 mm stereo jack more commonly seen in portable tape recorders and other consumer electronic products. Connector 118 and the corresponding 3.5 mm connector 104 have TIP, RING and SLEEVE ports. SLEEVE is connected to ground, the TIP and the RING ports at the sound card may be configured in one of several ways for providing DC bias and obtaining audio output. The function of the three ports will be described hereinafter with reference to connector jack 128 associated with sound card 108 representative of a Creative Labs sound card.

At present, it is sufficient to consider the direct connection of TIP to RING found on low cost microphones supplied with speech recognition software. Such microphones may use a Primo EM-124 electret element with approximately 200 μA drain current and provide tens of millivolts of voice output data. The quiescent voltage at TIP and RING of connector jack 118 is 3.0V−2.0 kΩ×200 μA=2.6V.

Figure 2A:
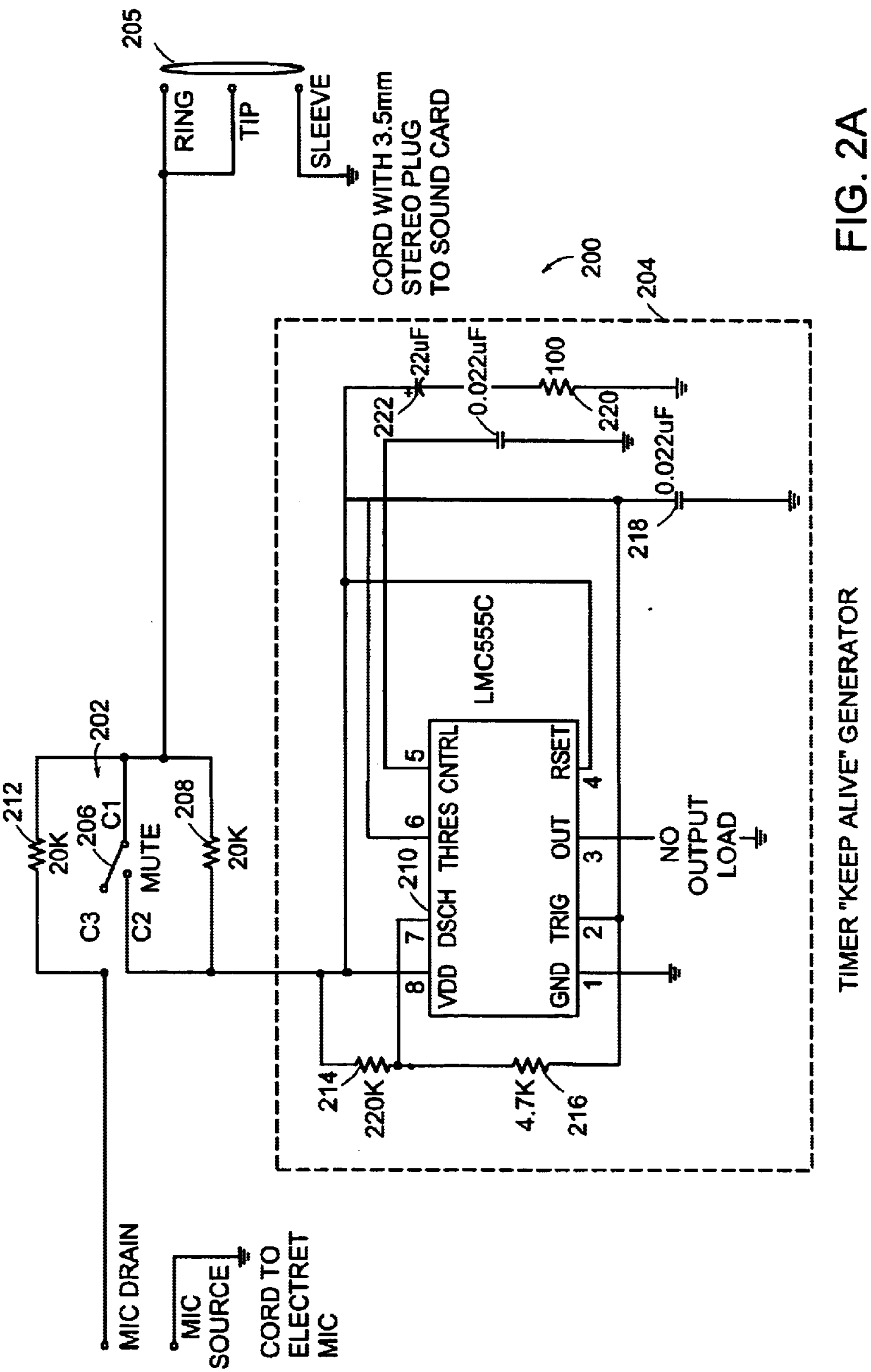
FIG. 2A is a schematic diagram of an exemplary microphone with mute switch and timer "keep alive" circuitry in accordance with the invention.

Referring now to FIG. 2A, a signal generator will be described that will maintain an active but suspended state in the speech recognition program while the microphone is muted. FIG. 2A is a schematic diagram of an exemplary microphone assembly 200 with a mute switch circuit 202, a timer "keep alive" generator 204 and a connector plug 205. A switch 206 is shown in the active mic position where DC bias from the sound card TIP and RING ports is applied directly to MIC DRAIN. A resistor 208 (e.g., 20 kΩ) in series with the "keep alive" generator 204 is also connected to the same ports. The generator is based on a timer circuit 210, a low power timer such as National Semiconductor LMC555C connected for astable operation.

With the switch 206 set as shown, the timer circuit 210 is idle, being current starved by a resistor 208 (e.g., 20 kΩ) positioned in parallel to the switch. When the switch is moved to the mute position, the microphone is current starved by the resistor 212, but the timer circuit 210 is active. With resistors 214 (e.g., 220 kΩ) and 216 (e.g., 4.7 kΩ), and capacitor 218 (e.g., 0.022 μF), a repetitive pulse waveform is generated at the OUT port of the timer circuit 210. Time low is approximately 70 μsec, time high is 340 μsec, therefore the repetition rate is about 244 Hz. This rectangular pulse waveform is continuous, unvarying and rich in harmonics. It does not resemble a voice signal. If it can be applied to the computer audio input node at the proper amplitude, the software will remain engaged while the microphone is muted but no spurious word recognition will occur.

Since the timer circuit 210 is preferably a CMOS integrated circuit, it draws current primarily during output waveform transitions and this current modulates the voltage at VDD (pin 8) because of the resistor 116 of the sound card 106 as shown in FIG. 1. The voltage excursions at the AUDIO SIGNAL node would be excessively high (several tens of millivolts) without some provision to attenuate them. Components such as resistor 220 (e.g., 100 Ω) and capacitor 222 (e.g., 22 μF) provide a load for this signal with a high pass corner frequency of 72 Hz, in other words for all harmonics of this waveform.

The AC voltage divider formed by resistor 220 of FIG. 2A and resistor 116 of FIG. 1 brings the "keep alive" signal amplitude to the more suitable level of a few millivolts. It is understood that the signal amplitude is chosen freely by scaling the resistor 220. Finally, resistors 212 and 208 provide current continuity (make before break) when the single-pole double-throw switch 206 is actuated, thus minimizing electrical transients and audible clicks. Mic current and "keep alive" current are nearly equal at 200 μA.

Figure 2B:
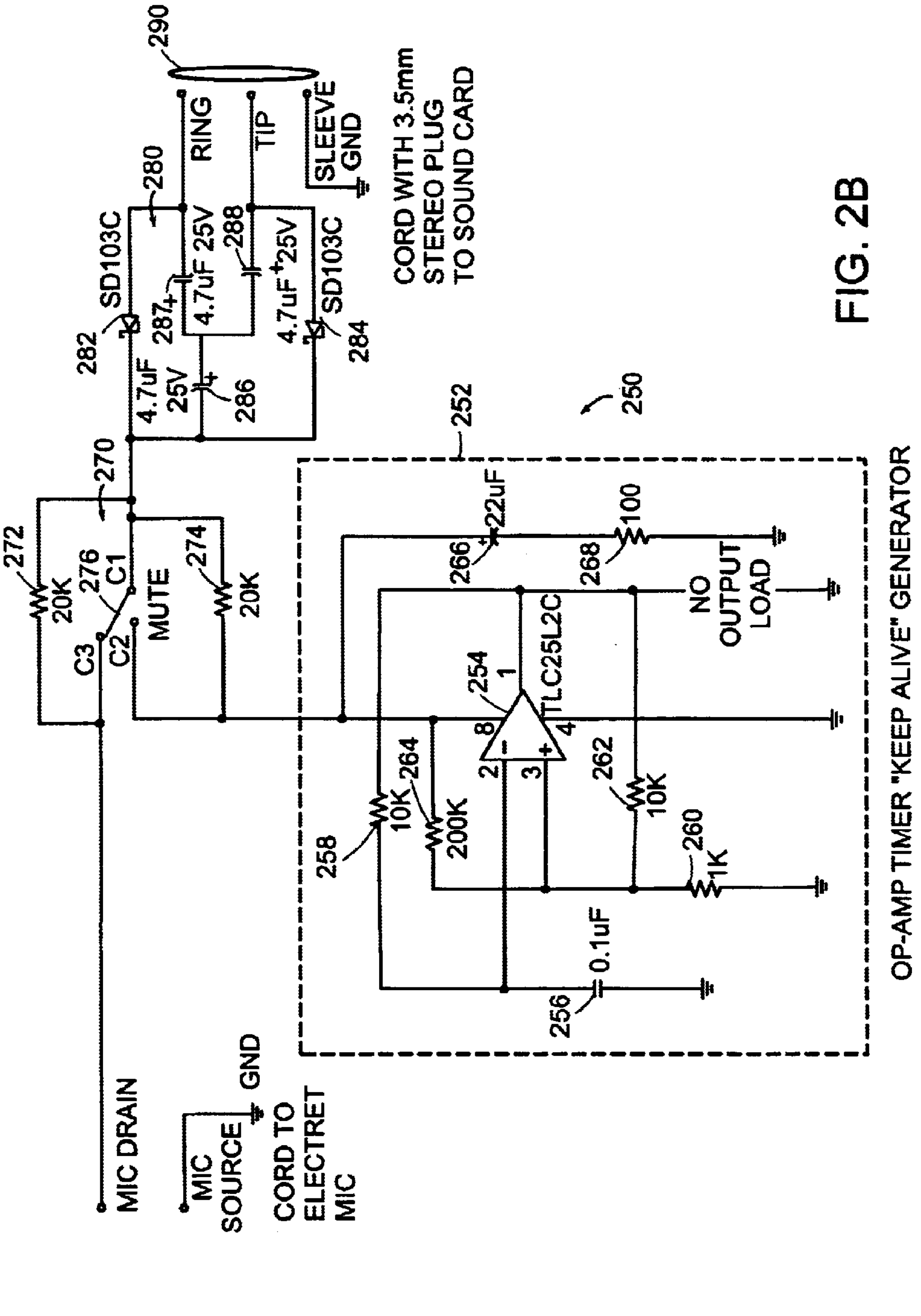
FIG. 2B is a schematic diagram of an alternative embodiment of FIG. 2A having op-amp "keep alive" circuitry and improved DC bias.

FIG. 2B is a schematic diagram of an alternative embodiment of FIG. 2A showing a microphone assembly 250 having an op-amp "keep alive" generator 252 and improved DC bias. Similar results are obtained from the different signal generator based on a low power opamp 254 such as Texas Instruments TLC25L2C. Here a low duty cycle rectangular pulse, rich in harmonics, is generated using negative and positive feedback. The "signature" or constant nature of this waveform is unlike voice and will again keep speech recognition software in a stable, suspended state while the microphone is muted. A repetition rate of approximately 120 Hz is determined by a capacitor 256 (e.g., 0.1μF) and a resistor 258 (e.g., 10 kΩ) at the inverting (−) input of the opamp 254. A duty factor of about 1% is established by resistors 260 (e.g., 1 kΩ) and 262 (e.g., 10 kΩ) at the non-inverting (+) input. A resistor 264 (e.g., 200 kΩ) adds a small fraction of VCC to the same (+) pin to overcome input offset voltage and ensure start-up.

The multivibrator waveform will swing almost rail to rail at the output of opamp 254. As before, a capacitor 266 (e.g., 22 μF) and a resistor 268 (e.g., 100 Ω) cause attenuation of VCC current swings allowing only a few millivolts of "keep alive" signal at the AUDIO INPUT of FIG. 1. Resistor 268 may be scaled for the signal amplitude desired. A mute switch circuit 270 includes resistors 272 (e.g., 20 kΩ) and 274 (e.g., 20 kΩ), and a mute switch 276 that are wired for make before break operation as detailed previously with reference to switch 206 of FIG. 2A.

An interface circuit 280 is provided between the mute switch circuit 270 and the connector plug 290. The interface circuit includes a diode 282 coupled to RING, a diode 284 coupled to TIP, and an arrangement of capacitors 286, 287 and 288 coupled therebetween. The function of the diodes 282 and 284, and the capacitors 286, 287 and 288 will be described with reference to the sound card input 128 of sound card 108 shown in FIG. 1. This and many other sound card circuits for providing mic bias and receiving audio at the TIP and/or RING ports may degrade mic performance, when the TIP and RING ports are tied together as shown in FIG. 1. For example, as resistors 130 (e.g., 2.2 kΩ) and 132 (e.g., 560 Ω) of sound card 108 are shorted into a common node by the connector jack 128, the voltage division on VCC allows only 20% of 5.0V minus 0.44V (mic current times resistor 130) to appear at MIC DRAIN. In other words, the mic will be starved operating at 0.56V into connector jack 128 versus a more normal 2.6V into connector jack 118.

The interface circuit 280 in FIG. 2B will maintain optimum mic bias with all sound card input wiring variations. The diode 282 will admit bias current that may be presented to the RING port and the diode 284 will admit current from the TIP. The diodes 282 and 284 will also conduct mic current from the sound card connector if TIP and RING are shorted as in connector jack 118, or even if each of the TIP and RING terminals is independently connected with resistors to VCC. The audio signal from the microphone is presented to both output terminals TIP and RING, as shown in FIG. 2B, equally and symmetrically by the "Y" connected capacitors 286–288. The values of the capacitors 286–288 can be, for example 4.7 μF, as the reactance of 4.7 μF represents a short at voice frequencies.

In the simplest case, each one of the diodes 282 and 284 could be paralleled with a non-polar electrolytic capacitor for coupling AC signals in the absence of DC current (consequently low impedance) through the diode. Such a non-polar capacitor is expensive and is sometimes replaced with two common polarized electrolytics connected fin series with like polarities at the common node. The cost of four polarized capacitors in place of two non-polar units is lower. Since in the present instance the anodes of the diodes are tied together, it is possible to complete the signal coupling function with three polarized electrolytics at even lower cost by connecting like (+) polarities together to form the "Y" connection of the capacitors 286–288. Schottky diodes are preferred in order to keep voltage drops to about 0.1V instead of 0.6V with conventional diodes.

It will be appreciated by virtue of its symmetry that the interface circuit 280 will accept DC bias and provide audio output to sound cards with every combination of bias resistors, terminating resistors and coupling capacitors on the TIP and RING terminals in addition to those shown as connector jacks 118 and 128. PNP transistors or PMOS FETs may also be used in place of diodes to conduct bias current from TIP and/or RING to the microphone and similarly avoid voltage starvation when connecting to the exemplary input of connector jack 128 of FIG. 1.

Additional exemplary embodiments of the invention may be based on different "keep alive" signals, for example, a discrete two-transistor multivibrator, white noise generated by a zener diode, pink noise, pseudo-random bit streams from shift registers, as well as arbitrary repetitive waveforms. The signal should provide a picket fence of harmonics in the frequency domain (narrow pulses in the time domain) so that it appears dissimilar to voice.

Figure 3A:
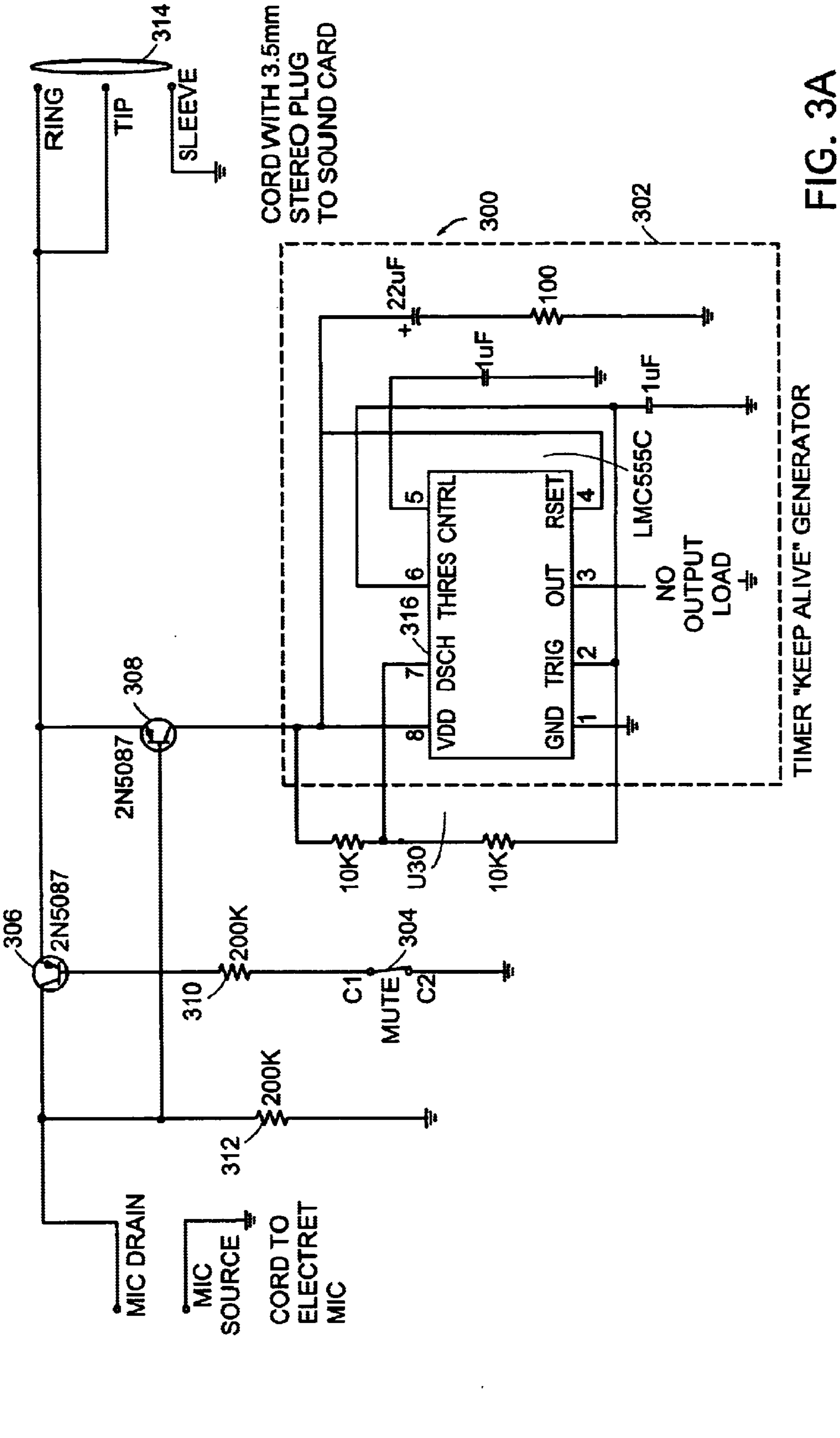
FIG. 3A is a schematic diagram of another embodiment in accordance with the invention having a simplified mute switch.

Another exemplary embodiment will now be described where the mute switch is configured as a single-pole single-throw. FIG. 3A is a schematic diagram of a microphone assembly 300 that includes a timer "keep alive" generator 302 and a simplified mute switch 304. This simplified switch is more suitable for a headset implementation where the mic boom may be rotated up, thus actuating an internal tilt or reed switch. Most headsets allow the user to swing the mic boom to the vertical position, away from the mouth to enable the user to cough or drink coffee, for example.

It is advantageous therefore to disable the microphone with a tilt switch as the boom is moved from nearly horizontal (active mic position) to nearly vertical (muted mic position) without additional manual steps by the user. This attitude sensitive switch may be embedded in the headset ear cup or in the mic boom, such that rotation of the boom end causes the switch to tilt. Similar results may be achieved with a magnet embedded in the mic boom and a glass reed switch in the ear cup. Boom rotation upwards will increase the distance of the magnet from the reed and the switch will open.

For the more conventional instances of a visible, manually operable mute on headset or desk microphones, a single-pole double-throw switch is not unduly complex. The mute circuit of the invention may then be placed in the headset with the mute switch actuator movable up and down at the ear cup. The mute circuit and switch may also be placed in a nodule at chest level on the headset cord. Desk mics may have the mute switch and circuit either at the base or at the top.

Returning now to FIG. 3A, the simplified switch 304 is grouped with a pair of PNP transistors 306, 308 and resistors 310 and 312 (e.g., 200 kΩ). In the active mic position as shown (closed switch), the switch 304 is conducting transistor 306 base current to ground through the resistor 310. This results in saturation of transistor 306 and enables the bias and audio path from the sound card via connector plug 314 to the mic. At the same time, the transistor 308 is kept off by the saturation voltage of the transistor 306 appearing across the base emitter junction of the transistor 308. When the mic boom is tilted up and the switch 304 is open, the transistor 306 is cut off. Now the transistor 308 conducts bias current from the sound card to enable the "keep alive" generator 302. No interruption in the flow of current results as the switch 304 is opened and again this make-before-break action prevents audible clicks. FIG. 3A depicts the generator 302 as including a timer circuit 316 and associated components configured similarly to that shown in FIG. 2A, but it will be appreciated that any of the aforementioned signal generators may be used.

Figure 3B:
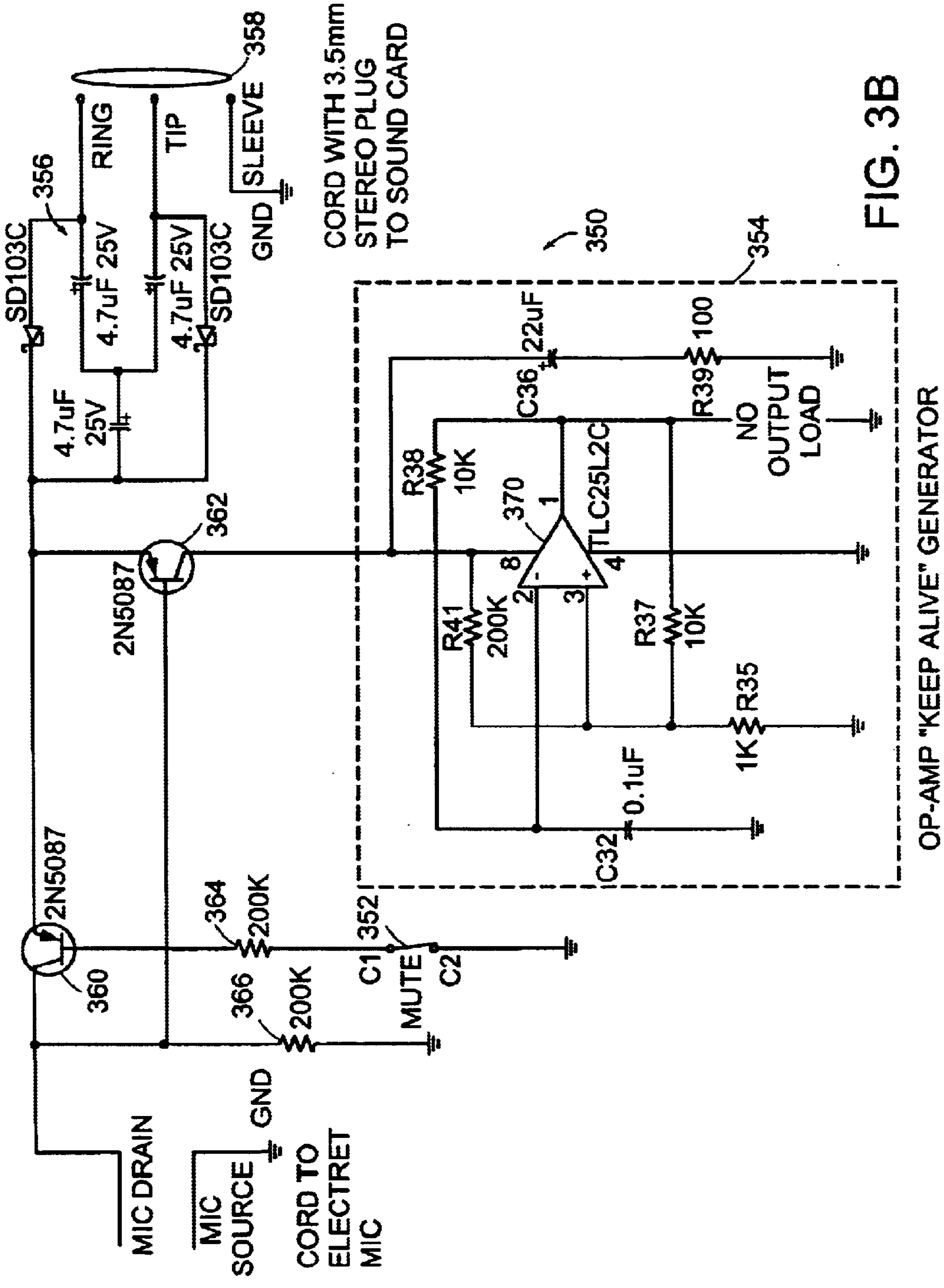
FIG. 3B is a schematic diagram of an alternative embodiment of FIG. 3A with improved DC bias.

FIG. 3B shows yet another exemplary embodiment of the invention combining the benefits of a single-pole single-throw mute switch with optimum DC bias. FIG. 3B is a schematic diagram of a microphone assembly 350 including a mute switch 352, an opamp "keep alive" generator 354, an interface circuit 356 and a connector plug 358. Optimum DC bias is obtained with the diode and capacitor network of interface 356 as described with reference to interface circuit 280 of FIG. 2B. The mute switch 352 is grouped with a pair of PNP transistors 360, and 362, and resistors 364 and 366, and operate in accordance with the description of transistors 306 and 308, and resistors 310 and 312 of FIG. 3A. In addition, the "keep alive" generator function may be performed with an opamp 370 and associated circuitry as described with reference to generator 252 of FIG. 2B, or any of the timer, multivibrator, white noise, pink noise, etc. generators described herein.

Although the present invention has been shown and described with respect to several preferred embodiments thereof, various changes, omissions and additions to the form and detail thereof, may be made therein, without departing from the spirit and scope of the invention.

What is claimed is:

1. A microphone system comprising:

a microphone for inputting voice data;

an output for transmitting said voice data to a device connectable thereto;

an interface circuit that provides optimum DC bias coupling from said device to said microphone for all sound card input wiring variations, said interface circuit comprising a diode coupled to RING, a diode coupled to TIP, and an arrangement of capacitors coupled therein between; and a circuit that operates to mute said voice data and provide a an alternate output signal to said device in order to maintain a suspended state of operation in said device, wherein amplitude of said voice data when muted is substantially zero.

2. The system of claim 1, wherein said signal comprises a repetitive waveform.

3. The system of claim 2, wherein said waveform is generated by an astable multivibrator.

4. The system of claim 1, wherein said signal comprises white noise.

5. The system of claim 1, wherein said signal comprises pink noise.

6. The system of claim 1, wherein said signal comprises a pseudorandom bit stream.

7. The system of claim 1, wherein said circuit operates to prevent spurious voice data by avoiding transients.

8. The system of claim 1, wherein said microphone comprises a headset microphone.

9. The system of claim 1, wherein said device comprises a computer utilizing voice recognition software.

10. The system of claim 1, wherein said circuit comprises a mute switch circuit and a signal generator.

11. The system of claim 10, wherein said mute switch circuit comprises a manually actuable switch.

12. The system of claim 10, wherein said mute switch circuit comprises an automatically actuable switch.

13. The system of claim 10, wherein said signal generator comprises a timer circuit.

14. The system of claim 10, wherein said signal generator comprises an opamp circuit.

15. A computer microphone system comprising:

a microphone for inputting voice data;

an output for transmitting said voice data to a computer that is responsive to voice data;

an interface circuit that provides optimum DC bias coupling from said computer to said microphone for all sound card input wiring variations, said interface circuit comprising a diode coupled to RING, a diode coupled to TIP, and an arrangement of capacitors coupled therein between;

a mute circuit that operates to mute transmission of said voice data to said computer; and a signal generator responsive to said mute circuit to provide directly a continuous signal to said output in place of said voice data to maintain a suspended state of operation in said computer, wherein amplitude of said voice data when muted is substantially zero.

16. The system of claim 15, wherein said signal comprises a repetitive waveform.

17. The system of claim 16, wherein said waveform is generated by an astable multivibrator.

18. The system of claim 15, wherein said signal comprises white noise.

19. The system of claim 15, wherein said signal comprises pink noise.

20. The system of claim 15, wherein said signal comprises a pseudorandom bit stream.

21. The system of claim 15, wherein said circuit operates to prevent spurious voice data by avoiding transients.

22. The system of claim 15, wherein said microphone comprises a headset microphone.

23. The system of claim 15, wherein said computer utilizes voice recognition software.

24. The system of claim 15, wherein said mute circuit comprises a manually actuable switch.

25. The system of claim 15, wherein said mute circuit comprises an automatically actuable switch.

26. The system of claim 15, wherein said signal generator comprises a timer circuit.

27. The system of claim 15, wherein said signal generator comprises an opamp circuit.

* * * * *

UNITED STATES PATENT AND TRADEMARK OFFICE

CERTIFICATE OF CORRECTION

PATENT NO. : 6,681,020 B1
DATED : January 20, 2004
INVENTOR(S) : Papadopoulos et al.

It is certified that error appears in the above-identified patent and that said Letters Patent is hereby corrected as shown below:

Title page,
Item [12], delete "Papopoulos" insert -- Papadopoulos et al. --
Item [75], Inventors, delete "Papopoulos" insert -- Papadopoulos --

Signed and Sealed this

Twenty-second Day of June, 2004

JON W. DUDAS
*Acting Director of the United States Patent and Trademark Office*